US012729136B2

(12) United States Patent
Takeuchi et al.

(10) Patent No.: US 12,729,136 B2
(45) Date of Patent: Sep. 8, 2026

(54) PROCESS FOR MAKING A COATED CATHODE ACTIVE MATERIAL

(71) Applicant: BASF SE, Ludwigshafen am Rhein (DE)

(72) Inventors: Ryosuke Takeuchi, Amagasaki (JP); Ji-Yong Shin, Amagasaki (JP); Numata Eri, Amagasaki (JP); Ito Seitaro, Amagasaki (JP); Christoph Erk, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 482 days.

(21) Appl. No.: 18/248,461

(22) PCT Filed: Oct. 12, 2021

(86) PCT No.: PCT/EP2021/078103

§ 371 (c)(1),
(2) Date: Apr. 10, 2023

(87) PCT Pub. No.: WO2022/078980

PCT Pub. Date: Apr. 21, 2022

(65) Prior Publication Data

US 2023/0406724 A1 Dec. 21, 2023

(30) Foreign Application Priority Data

Oct. 15, 2020 (EP) .................................... 20201960
Oct. 1, 2021 (EP) .................................... 21200525

(51) Int. Cl.
*H01M 10/0525* (2010.01)
*C01G 53/50* (2025.01)
*H01M 4/505* (2010.01)
*H01M 4/525* (2010.01)

(52) U.S. Cl.
CPC ............ *C01G 53/50* (2013.01); *H01M 4/505* (2013.01); *H01M 4/525* (2013.01); *H01M 10/0525* (2013.01); *C01P 2004/61* (2013.01); *C01P 2006/40* (2013.01)

(58) Field of Classification Search
CPC ........... H01M 10/052; H01M 10/0525; H01M 4/505; H01M 4/525
See application file for complete search history.

(56) References Cited

U.S. PATENT DOCUMENTS

| | | | |
|---|---|---|---|
| 2011/0195309 A1 | 8/2011 | Fumiharu et al. | |
| 2015/0194673 A1 | 7/2015 | Masanori et al. | |
| 2021/0280864 A1 | 9/2021 | Kaneda et al. | |
| 2022/0127781 A1 | 4/2022 | Altman et al. | |
| 2022/0264730 A1 | 8/2022 | De Jager et al. | |

FOREIGN PATENT DOCUMENTS

| | | | | |
|---|---|---|---|---|
| EP | 3561924 A1 | 10/2019 | | |
| JP | 2000323143 A | 11/2000 | | |
| JP | 2019186221 A | 10/2019 | | |
| WO | 2013018588 A1 | 2/2013 | | |
| WO | WO-2016000982 A1 * | 1/2016 | ............ | H01M 4/131 |
| WO | 2020069882 A1 | 4/2020 | | |

OTHER PUBLICATIONS

European Search Report for EP Patent Application No. 20201960.0 dated Apr. 1, 2021; 3 pages.

International Search Report and Written Opinion for PCT/EP2021/078103 mailed on Dec. 20, 2021, 11 pages.

Nakajima et al., "Nb2O5-nH2O as a Heterogeneous Catalyst with Water-Tolerant Lewis Acid Sites", J. Am. Chem. Soc., vol. 133, pp. 4224-4227 (2011).

* cited by examiner

*Primary Examiner* — Kevin E Yoon
(74) *Attorney, Agent, or Firm* — Armstrong Teasdale LLP

(57) ABSTRACT

Described herein is a process for making an electrode active material according to general formula $Li_{1+x}(TM_{1-y}M^1_y)_{1-x}O_2$, where TM includes a combination of Ni and at least one of Co, Mn and Al, $M^1$ is selected from the group consisting of Nb, Ta, and at least one of Co, Mn and Al, y is in a range of from 0.001 to less than 0.01, and x is in a range of from zero to 0.2, said process including the following steps:

(a) mixing
  (A) a mixed oxide or (oxy)hydroxide of Mn, Co and Ni, and
  (B) at least one lithium compound selected from the group consisting of lithium hydroxide, lithium oxide and lithium carbonate, and
  (C) an amorphous compound of Nb or Ta, and
(b) subjecting said mixture to heat treatment, where at least 60 mole-% of a transition metal of TM is Ni.

12 Claims, No Drawings

PROCESS FOR MAKING A COATED CATHODE ACTIVE MATERIAL

CROSS-REFERENCE TO RELATED APPLICATIONS

This application is a U.S. National Phase Application of PCT/EP2021/078103, filed Oct. 12, 2021, which claims the benefit of priority to European Patent Application No. 20201960.0, filed Oct. 15, 2020, and European Patent Application No. 21200525.0, filed Oct. 1, 2021, the entire contents of which are hereby incorporated by reference herein.

The present invention is directed towards a process for making an electrode active material according to general formula $L_{1+x}(TM_{1-y}M^1_y)_{1-x}O_2$, wherein TM includes a combination of Ni and at least one of Co, Mn and Al, and optionally at least one more metal selected from Mg, Al, Ti, Zr, and W, and x is in the range of from zero to 0.2, and $M^1$ is selected from Nb and Ta, and y is in the range of from 0.001 to less than 0.01, preferably 0.001 to 0.0065, more preferably 0.002 to 0.005:

(a) mixing
  (A) a particulate mixed oxide or (oxy)hydroxide of Mn, Co and Ni, and
  (B) at least one lithium compound selected from lithium hydroxide, lithium oxide and lithium carbonate, and
  (C) an amorphous compound of Nb or Ta,
(b) Subjecting said mixture to heat treatment at a temperature in the range of from 700 to 1000° C., wherein at least 60 mole-% of the metal of TM is Ni.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Cathode active materials are generally manufactured by using a two-stage process. In a first stage, a sparingly soluble compound of the transition metal(s) is made by precipitating it from a solution, for example a carbonate or a hydroxide. Said sparingly soluble salts are in many cases also referred to as precursors. In a second stage, a precursor is mixed with a lithium compound, for example $Li_2CO_3$, LiOH or $Li_2O$, and calcined at high temperatures, for example at 600 to 1100° C. In special recipes, dopants may be added, for example alumina, titania, zirconia, or oxides or (oxy)hydrides of transition metals such as W, Mo or the like.

However, they still leave room for improvement with respect to their capacity fade at various temperatures, especially at temperatures of 45° C. or above, in particular to the capacity fade at such high temperatures. Furthermore, the cycle stability and C rate performance at higher temperatures such as 45° C. or more may be improved as well.

It was therefore an objective of the present invention to provide batteries with an improved capacity at 45° C. or higher, in particular to the capacity loss at such high temperatures, and to provide suitable cathode active materials for such batteries. It was furthermore an objective to provide a process for making cathode active materials for batteries with an improved capacity at 45° C. or higher in particular to the capacity loss at such high temperatures.

Accordingly, the process defined at the outset has been found, hereinafter also being referred to as inventive process or process according to the (present) invention.

The inventive process comprises a sequence of at least two steps as defined at the outset, hereinafter also defined as step (a) and step (b). The inventive process will be described in more detail below.

Step (a) includes mixing (A) a particulate mixed oxide or (oxy)hydroxide of Ni and at least one of Mn, Co and Al, hereinafter also referred to as precursor (A), and (B) at least one lithium compound selected from lithium hydroxide, lithium oxide and lithium carbonate, hereinafter also referred to as lithium source (B) or source of lithium (B), and (C) an amorphous compound of Nb or Ta, preferably of Nb.

Precursor (A) is a particulate mixed oxide or (oxy) hydroxide of nickel and at least one of cobalt and manganese and aluminum. More than 50 mol-% of the metal of precursor (A) is nickel.

In one embodiment of the present invention, the metal part of precursor (A) corresponds to TM, and at least 60 mol-% of the metal in precursor (A) is Ni. In another embodiment of the present invention, the metal part of precursor (A) does not correspond to TM, and a compound (D) is added during mixing step (a).

In one embodiment of the present invention, said precursor (A) comprises at least one of Mg, Al and Y or at least one transition metal selected from Ti, Zr, Fe, Mo, and W. In other embodiments, said precursor does not contain any metals other than nickel and cobalt or manganese or aluminum.

In one embodiment of the present invention, TM is a combination of metals according to general formula (I)

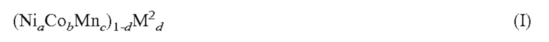

$$(Ni_aCo_bMn_c)_{1-d}M^2_d \quad (I)$$

wherein a is in the range of from 0.6 to 0.99, preferably from 0.6 to 0.95, more preferably from 0.8 to 0.93, b is in the range of from 0.005 to 0.2, preferably from 0.05 to 0.1, c is in the range of from 0.005 to 0.2, preferably from 0.03 to 0.15, and d is in the range of from zero to 0.1, preferably from 0.01 to 0.05.

M is at least one of Al, Mg, Ti, Mo, W and Zr, and b+c>zero, and a+b+c=1.

Said precursor (A) is preferably obtained by co-precipitating nickel and the at least one of cobalt and manganese and aluminum and—if applicable—further metals as composite hydroxides from an aqueous solution containing nitrates, acetates or preferably sulfates of nickel and cobalt and/or manganese in a stoichiometric ratio corresponding to TM. Said co-precipitation may be accomplished by the addition of alkali metal hydroxide, for example potassium hydroxide or sodium hydroxide, in a continuous, semi-continuous or batch process. Said co-precipitation is then followed by removal of the mother liquor, for example by filtration, and subsequent removal of water.

Said precursor (A) is particulate which means it is in particulate form. In one embodiment of the present invention, the mean particle diameter (D50) of precursor (A) is in the range of from 3 to 16 μm, preferably 5 to 12 μm and more preferably 7 to 10 μm. The mean particle diameter (D50) in the context of the present invention refers to the median of the volume-based particle diameter, as can be determined, for example, by light scattering. In one embodiment, the precursor has a monomodal particle diameter distribution. In other embodiments, the particle distribution of the precursor may be bimodal, for example with one maximum in the range of from 1 to 5 μm and a further maximum in the range of from 7 to 16 μm.

The particle shape of the secondary particles of precursor (A) is preferably spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, precursor (A) is comprised of secondary particles that are agglomerates of primary particles. Preferably, said precursor is comprised of spherical secondary particles that are agglomerates of primary particles. Even more preferably, said precursor is comprised of spherical secondary particles that are agglomerates of spherical primary particles or platelets.

In one embodiment of the present invention, precursor (A) may have a particle diameter distribution span in the range of from 0.5 to 0.9, the span being defined as [(D90)−(D10)] divided by (D50), all being determined by LASER analysis. In another embodiment of the present invention, said precursor may have a particle diameter distribution span in the range of from 1.1 to 1.8.

In one embodiment of the present invention the specific surface (BET) of precursor (A) is in the range of from 2 to 10 $m^2/g$ or even more than 10 up to 100 $m^2/g$, determined by nitrogen adsorption, for example in accordance with to DIN-ISO 9277:2003-05.

Some metals are ubiquitous, such as sodium, calcium or zinc, and traces of them virtually present everywhere, but such traces will not be taken into account in the description of the present invention. Traces of metals in this context will mean amounts of 0.05 mol-% or less, referring to the total metal content TM.

Precursor (A) may contain sulfate, for example 0.1 to 0.5% by weight of sulfate, determined by ion chromatography. Said precursor may contain carbonate, for example 0.1 to 2% by weight of carbonate, each percentage relating to the entire weight of the precursor.

Sources of lithium (B) are selected from lithium carbonate, lithium oxide, $Li_2O$, and lithium hydroxide, LiOH, and include hydrates of lithium hydroxide such as, but not limited to $LiOH \cdot H_2O \cdot LiOH$ and $LiOH \cdot H_2O$ are preferred.

In one embodiment of the present invention, said source of lithium (B) has an average particle diameter (D50) in the range of from 10 to 500 μm, determined through observations by scanning electron microscope (SEM) or by laser-diffraction particle size analyzers using a dry cell. A third compound present in step (a) is amorphous compound of Nb or Ta, preferably of Nb, hereinafter also referred to as compound (C). Compound (C) may be selected from amorphous $Nb_2O_5$ or amorphous $Ta_2O_5$, amorphous $Nb_2O_5$ being preferred which includes niobic acid, for example $Nb_2O_5 \cdot aq$ or $Nb_2O_5 \cdot n\ H_2O$ with n from, e.g., 0.2 to 5, mostly denoted $Nb_2O_5 \cdot H_2O$ although the stoichiometry of $Nb_2O_5$ and water is not precisely 1:1. The determination whether compound (C) is amorphous or not may be carried out by X-ray diffraction analysis. In case of amorphous samples, no sharp peaks are observed in the X-ray diffraction diagram.

In one embodiment of the present invention, said compound (C) has an average particle diameter (D50) in the range of from 1 to 100 μm, preferably 1.2 to 16.5 μm, determined through observations by scanning electron microscope (SEM) or by laser-diffraction particle size analyzers.

In one embodiment of the present invention, a compound (D) is present in step (a), for example oxides or (oxy) hydroxides of Al, Ti and Zr. Examples are $TiO_2$ selected from rutile and anatase, anatase being preferred, furthermore basic titania such as $TiO(OH)_2$, $ZrO_2$, $Zr(OH)_4$, $Al(OH)_3$, $Al_2O_3$, $Al_2O_3 \cdot aq$, and AlOOH. Preferred are Al compounds such as $Al(OH)_3$, $\alpha$-$Al_2O_3$, $\gamma$-$Al_2O_3$, $Al_2O_3 \cdot aq$, and AlOOH, and $TiO_2$ and $Zr(OH)_4$.

In one embodiment of the present invention, compound (D) is present in an amount that corresponds to the variable d in formula (I) of TM.

In one embodiment of the present invention, the difference of the molar amounts of the metals in step (a) of lithium versus TM and compound (C) and, if applicable, compound (D), is in the range of from zero to 0.2, preferably 0.001 to 0.1 and even more preferably from 0.002 to 0.005.

In one embodiment of the present invention, the molar ratio of the metals in step (a) of compound (C) versus TM and, if applicable, compound (D), is in the range of from 0.001 to less than 0.01, preferably 0.001 to 0.0065 and even more preferably from 0.002 to 0.003.

Examples of suitable apparatuses for performing step (a) are high-shear mixers, tumbler mixers, plough-share mixers and free fall mixers.

In one embodiment of the present invention, step (a) is performed at a temperature in the range of from ambient temperature to 200° C., preferably 20 to 50° C.

In one embodiment of the present invention, step (a) has a duration of 10 minutes to 2 hours. Depending on whether additional mixing is performed in step (b) or not, thorough mixing has to be accomplished in step (a).

Although it is possible to add an organic solvent, for example glycerol or glycol, or water in step (a) it is preferred to perform step (a) in the dry state, that is without addition of water or of an organic solvent.

Mixing of precursor (A), source of lithium (B) and compound (C) and—optionally—compound (D) may be performed all in one or in sub-steps, for example by first mixing source of lithium (B) and compound (C) and adding such mixture to precursor (A), or by first mixing precursor (A) and source of lithium (B) and then adding compound (C) and, optionally, compound (D), or by first mixing compound (C) and precursor (A) and then adding source of lithium (B). It is preferred to first mix precursor (A) and source of lithium (B) and compound (C) in one step.

A mixture is obtained from step (a).

Step (b) includes subjecting said mixture to heat treatment, for example at a temperature in the range of from 600 to 950° C., preferably 650 to 925° C.

In one embodiment of the present invention, the mixture from step (a) is heated to 650 to 1000° C. with a heating rate of 0.1 to 10° C./min.

In one embodiment of the present invention, the temperature is ramped up before reaching the desired temperature of from 650 to 1000° C., preferably 750 to 900° C. For example, first the mixture from step (a) is heated to a temperature to 350 to 550° C. and then held constant for a time of 10 min to 4 hours, and then it is raised to 650° C. up to 1000° C.

In embodiments wherein in step (a) at least one solvent has been used, as part of step (b), or separately and before commencing step (b), such solvent(s) are removed, for example by filtration, evaporation or distilling of such solvent(s). Preferred are evaporation and distillation.

In one embodiment of the present invention, step (b) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (b) is performed in an oxygen-containing atmosphere, for example in a nitrogen-air mixture, in a rare gas-oxygen mixture, in air, in oxygen or in oxygen-enriched air. In a preferred embodiment, the atmosphere in step (b) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, the stoichiometry of lithium in step (a) is in the range of from 90 to 95 mol-% relative to the sum of TM and metals other than lithium from the dopant(s), if applicable, and step (b) is followed by another mixing step with a source of lithium and another heat treatment step.

After heating, the calcined material is cooled to ambient temperature. In the context of the present invention, the time required for cooling is neglected with respect to duration of step (b).

By the inventive process, an electrode active material according to general formula $Li_{1+x}(TM_{1-y}M^1_y)_{1-x}O_2$ is obtained wherein TM includes a combination of Ni and at least one of Co, Mn and Al, and optionally at least one more metal selected from Mg, Al, Ti, Zr, and W, and x is in the range of from zero to 0.2, and $M^1$ is selected from Nb and Ta, and y is in the range of from 0.001 to less than 0.01, preferably 0.01 to 0.0065, more preferably from 0.002 to 0.003.

Said electrode active material has a high initial capacity, and very low capacity fading and resistance growth at 25° C., and furthermore even at 45° C.

A further aspect of the present invention is directed towards electrode active materials, also referred to as inventive electrode active materials or inventive cathode active materials. Inventive electrode active materials have the general formula $Li_{1-x}(TM_{1-y}M^1_y)_{1-x}O_2$ wherein TM includes a combination of Ni and at least one of Co, Mn and Al, and optionally at least one more metal selected from Mg, Al, Ti, Zr, and W, and x is in the range of from zero to 0.2, and $M^1$ is selected from Nb and Ta, and y is in the range of from 0.001 to less than 0.01, preferably 0.001 to 0.0065, more preferably 0.002 to 0.003, and an average particle diameter (D50) in the range of from 3 to 20 μm, wherein at least 60 mol-% of TM is Ni, and wherein Nb or Ta, respectively, is enriched on the surface of the primary particles compared to the bulk. Said enrichment may be detected by TEM/XPS.

Inventive electrode active materials may be made according to the inventive process.

In one embodiment of the present invention, the mean particle diameter (D50) of inventive electrode active materials is in the range of from 3 to 16 μm, preferably 5 to 12 μm and more preferably 7 to 10 μm. The mean particle diameter (D50) in the context of the present invention refers to the median of the volume-based particle diameter, as can be determined, for example, by light scattering. In one embodiment, the precursor has a monomodal particle diameter distribution. In other embodiments, the particle distribution of the precursor may be bimodal, for example with one maximum in the range of from 1 to 5 μm and a further maximum in the range of from 7 to 16 μm.

Inventive cathode active materials are comprised of secondary particles that are agglomerates of primary particles. Preferably, said precursor is comprised of spherical secondary particles that are agglomerates of primary particles. Even more preferably, said precursor is comprised of spherical secondary particles that are agglomerates of spherical primary particles or platelets.

In one embodiment of the present invention, the mean particle diameter (D50) of inventive cathode active materials is in the range of from 3 to 16 μm, preferably 5 to 12 μm and more preferably 7 to 10 μm. The mean particle diameter (D50) in the context of the present invention refers to the median of the volume-based particle diameter, as can be determined, for example, by light scattering. In one embodiment, the precursor has a monomodal particle diameter distribution. In other embodiments, the particle distribution of the precursor may be bimodal, for example with one maximum in the range of from 1 to 5 μm and a further maximum in the range of from 7 to 16 μm.

The particle shape of the secondary particles of inventive cathode active materials is preferably spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, inventive cathode active materials are comprised of secondary particles that are agglomerates of primary particles. Preferably, said precursor is comprised of spherical secondary particles that are agglomerates of primary particles. Even more preferably, said precursor is comprised of spherical secondary particles that are agglomerates of spherical primary particles or platelets.

In one embodiment of the present invention, inventive cathode active materials have a particle diameter distribution span in the range of from 0.5 to 0.9, the span being defined as [(D90)−(D10)] divided by (D50), all being determined by LASER analysis. In another embodiment of the present invention, said precursor may have a particle diameter distribution span in the range of from 1.1 to 1.8.

In one embodiment of the present invention the specific surface (BET) in inventive cathode active materials is in the range of from 0.1 to 1.5 $m^2/g$ and preferably from 0.2 up to 1.0 $m^2/g$, determined by nitrogen adsorption, for example in accordance with to DIN-ISO 9277:2003-05.

In one embodiment of the present invention, TM in inventive cathode active materials is a combination of metals according to general formula (I)

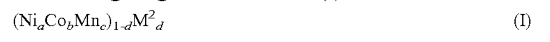

$$(Ni_aCo_bMn_c)_{1-d}M^2_d \quad (I)$$

a is in the range of from 0.6 to 0.99, preferably from 0.6 to 0.95, more preferably from 0.8 to 0.93, b is in the range of from 0.005 to 0.2, preferably from 0.05 to 0.1, c is in the range of from 0.005 to 0.2, preferably from 0.03 to 0.15, and d is in the range of from zero to 0.1, preferably from 0.01 to 0.05.

M is at least one of Mg, Al, Mg, Ti, Mo, W and Zr, and b+c>zero, and a+b+c=1.

Some metals are ubiquitous, such as sodium, calcium or zinc, and traces of them virtually present everywhere, but such traces will not be taken into account in the description of the present invention. Traces of metals in this context will mean amounts of 0.05 mol-% or less, referring to the total metal content TM.

Inventive cathode active materials are comprised of secondary particles that are agglomerates of primary particles. Preferably, said precursor is comprised of spherical secondary particles that are agglomerates of primary particles. Even more preferably, said precursor is comprised of spherical secondary particles that are agglomerates of spherical primary particles or platelets.

A further aspect of the present invention refers to electrodes comprising at least one particulate cathode active material according to the present invention. They are particularly useful for lithium ion batteries. Lithium ion batteries comprising at least one electrode according to the present invention exhibit a good cycling behavior/stability. Electrodes comprising at least one particulate cathode active material according to the present invention are hereinafter also referred to as inventive cathodes or cathodes according to the present invention.

Specifically, inventive cathodes contain (α) at least one inventive particulate cathode active material, (β) carbon in electrically conductive form, (γ) a binder material, also referred to as binders or as binders (γ), and, preferably, (δ) a current collector.

In a preferred embodiment, inventive cathodes contain (α) 80 to 98% by weight inventive particulate cathode active material, (β) 1 to 17% by weight of carbon, (γ) 1 to 15% by weight of binder, percentages referring to the sum of (α), (β) and (γ).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (β). Carbon (β) can be selected from soot, active carbon, carbon nanotubes, graphene, and graphite, and from combinations of at least two of the foregoing.

Suitable binders (γ) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol-% of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (γ) is polybutadiene.

Other suitable binders (γ) are selected from polyethylene oxide (PEO), cellulose, carboxymethylcellulose, polyimides and polyvinyl alcohol.

In one embodiment of the present invention, binder (γ) is selected from those (co)polymers which have an average molecular weight $M_w$ in the range from 50,000 to 1,000,000 g/mol, preferably to 500,000 g/mol.

Binder (γ) may be cross-linked or non-cross-linked (co) polymers.

In a particularly preferred embodiment of the present invention, binder (γ) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (γ) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to inventive cathode active material. In other embodiments, inventive cathodes may comprise 0.1 up to less than 1% by weight of binder(s).

A further aspect of the present invention is a battery, containing at least one cathode comprising inventive cathode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

(II)

(III)

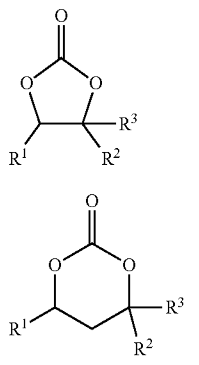

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

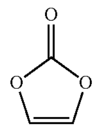

The solvent or solvents is/are preferably used in the water-free state, i.e. with a water content in the range from 1 ppm to 0.1% by weight, which can be determined, for example, by Karl-Fischer titration.

Electrolytes further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In other embodiments, the present invention refers to an all-solid battery, and the electrolyte is solid at ambient temperature.

In one embodiment of the present invention, such solid electrolyte has a lithium-ion conductivity at 25° C. of ≥0.1 mS/cm, preferably in the range of from 0.1 to 30 mS/cm, measurable by, e.g., by impedance spectroscopy.

In one embodiment of the present invention, such solid electrolyte comprises $Li_3PS_4$, yet more preferably orthorhombic β-$Li_3PS_4$.

In one embodiment of the present invention, solid electrolyte (C) is selected from the group consisting of $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$—$P_2S_5$—LiI, $Li_2S$—$P_2S_5$—$Z_mS_n$ wherein m and n are positive numbers and Z is a member selected from the group consisting of germanium, gallium and zinc, $Li_2S$—$SiS_2$—$Li_3PO_4$, $Li_2S$—$SiS_2$—$Li_yPO_z$, wherein y and z are positive numbers, $Li_7P_3S_{11}$, $Li_3PS_4$, $Li_{11}S_2PS_{12}$, $Li_7P_2S_8I$, and $Li_{7-r-2s}SPS_{6-r-s}X_r$ wherein X is chlorine, bromine or iodine, and the variables are defined as follows:

$0.8 \leq r \leq 1.7$ $0 \leq s \leq (-0.25\ r)+0.5$.

A particularly preferred example of solid electrolytes (C) is $Li_6PS_5Cl$, thus, r=1.0 and s=zero.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good cycling stability and a low capacity fading.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

$Nb_2O_5$— $H_2O$: niobic acid, amorphous

Starting Materials:

I. Providing Starting Materials for the Calcination

I.1 Synthesis of a Precursor (A.1)

A stirred tank reactor was charged with an aqueous solution 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained the sulfates of Ni, Co and Mn at a molar ratio of 8.8:0.6:0.6 and a total transition metal concentration of 1.65 mol/kg. The aqueous sodium hydroxide solution contained 25 wt. % sodium hydroxide solution and 25 wt. % ammonia solution in a weight ratio of 6. The pH value was kept at 12 by the separate feed of an aqueous sodium hydroxide solution. Beginning with the commencement of all feeds, mother liquor was removed continuously. After 33 hours all feed flows were stopped. The mixed transition metal (TM) oxyhydroxide precursor TM-OH.1 (precursor (A.1) was obtained by filtration of the resulting suspension, washing with distilled water, drying at 120° C. in air and sieving. (D50): 10 μm I.2: Mixing Step The mixed transition metal oxyhydroxide precursor TM-OH.1 was mixed with LiOH monohydrate with a Li/(Ni+Co+Mn) molar ratio of 1.05. The mixture was heated to 780° C. and kept for 10 hours in a forced flow of a mixture of 100% oxygen. After cooling to ambient temperature, the resultant powder was deagglomerated and sieved through a 45 μm mesh to obtain the electrode active material B-CAM 1.

D50=10.0 μm determined using the technique of laser diffraction in a Mastersizer 3000 instrument from Malvern Instruments. The Li and transition metal content were determined by ICP analytics. Residual moisture at 250° C. was determined to be below 300 ppm.

II. Synthesis of Inventive and of Comparative Cathode Active Materials

II.1 Synthesis of CAM.1 (Inventive)

TM-OH.1 and an amorphous $Nb_2O_5 \cdot H_2O$ with a D50 of 1.4 μm were mixed with LiOH monohydrate with a Li/(Ni+Co+Mn) molar ratio of 1.05, and the Nb/(Ni+Co+Mn) molar ratio of 0.003. The mixture was heated to 760° C. and kept for 10 hours in a forced flow of 100% oxygen. After cooling to ambient temperature, the resultant powder was deagglomerated and sieved through a 45 μm mesh to obtain the electrode active material CAM.1.

II.1 Synthesis of CAM.2 (Inventive)

TM-OH.1 and amorphous niobic acid $Nb_2O_5 \cdot H_2O$ with a D50 of 16.2 μm were mixed with LiOH monohydrate with a Li/(Ni+Co+Mn) molar ratio of 1.05, and the Nb/(Ni+Co+Mn) molar ratio of 0.003. The mixture was heated to 760° C. and kept for 10 hours in a forced flow of 100% oxygen. After cooling to ambient temperature, the resultant powder was deagglomerated and sieved through a 45 μm mesh to obtain the electrode active material CAM.2.

II.3 Synthesis of CAM.3 (Inventive)

TM-OH.1 and an amorphous niobium oxide $Nb_2O_5$ with a D50 of 1.5 μm were mixed with LiOH monohydrate with a Li/(Ni+Co+Mn) molar ratio of 1.05, and the Nb/(Ni+Co+Mn) molar ratio of 0.003. The mixture was heated to 760° C. and kept for 10 hours in a forced flow of 100% oxygen. After cooling to ambient temperature the resultant powder was deagglomerated and sieved through a 45 μm mesh to obtain the electrode active material CAM.3.

II.4 Synthesis of C-CAM.4 (Comparative)

TM-OH.1 and a crystalline niobium oxide $Nb_2O_5$ with a D50 of 51.2 μm were mixed with LiOH monohydrate with a Li/(Ni+Co+Mn) molar ratio of 1.05, and the Nb/(Ni+Co+Mn) molar ratio of 0.003. The mixture was heated to 760° C. and kept for 10 hours in a forced flow of a mixture of 100% oxygen. After cooling to ambient temperature the resultant powder was deagglomerated and sieved through a 45 μm mesh to obtain the electrode active material C-CAM.4.

The comparative materials C-CAM.5 to C-CAM.7 were made accordingly but with 1%, 2%, or 3%, respectively of $Nb_2O_5 \cdot H_2O$, (D50) of 1.4 μm. The comparative materials C-CAM.8 to C-CAM.10 were made accordingly but with 1%, 2%, or 3%, respectively of $Nb_2O_5 \cdot H_2O$, (D50) of 16.2 μm.

Each CAM.1, CAM.2, CAM.3 and C-CAM.4 to C-CAM.10 were comprised of secondary particles that were agglomerates of primary particles.

In each of CAM.1, CAM.2, and CAM.3, an enrichment of Nb on the surface of the primary particles could be detected compared to the bulk of the primary particles.

III Testing of the Cathode Active Material

III.1 Manufacture of Electrodes

III.1.1 Manufacture of Positive Electrodes

PVDF binder (Solef® 5130) was dissolved in NMP (Merck) to produce a 7.5 wt. % solution. For electrode preparation, binder solution (3 wt. %), graphite (SFG6L, 2 wt. %), and carbon black (Super C65, 1 wt.-%) were suspended in NMP. After mixing using a planetary centrifugal mixer (ARE-250, Thinky Corp.; Japan), either any of inventive CAM.1 to CAM.4 or comparative cathode active materials (94 wt. %) was added and the suspension was mixed again to obtain a lump-free slurry. The solid content of the slurry was adjusted to 65%. The slurry was coated onto Al foil using a KTF-S roll-to-roll coater (Mathis AG). Prior to use, all electrodes were calendared. The thickness of cathode material was 70 μm, corresponding to 15 mg/cm$^2$. All electrodes were dried at 105° C. for 7 hours before battery assembly.

III.2 Manufacture of an Electrolyte

A base electrolyte composition was prepared containing 12.7 wt % of $LiPF_6$, 26.2 wt % of ethylene carbonate (EC), and 61.1 wt % of ethyl methyl carbonate (EMC) (EL base 1), based on the total weight of EL base 1.

III.3 Manufacture of a Test Cell: Coin-Type Half Cells

Coin-type half cells (20 mm in diameter and 3.2 mm in thickness) comprising a cathode prepared as described under III.1.1 and lithium metal foil as working and counter electrode, respectively, were assembled upon injection of 0.15 mL of the electrolyte as described under III.2 and sealed in an Ar-filled glove box. The cathode, a separator, and the lithium metal foil were superposed, respectively, to produce a coin half cell.

IV Evaluation of Cell Performance

IV.1 Evaluation of Coin-Type Half Cell Performance

Cell performance was evaluated using the coin-type cells as described in III.3.1. For the battery performance, initial capacity and Coulombic efficiency for initial performance, and cycling capacity retention at 25° C. and 45° C. and resistance growth for long term stability of the cells were measured.

IV.1.1 Initial Performance

The initial performance was measured as follows:

Coin half cells fabricated according to III.3.1 were tested in a voltage range between 4.3 V to 3.0 V at 25° C. For the initial cycle, the initial charge was conducted in the CC-CV mode, i.e., a constant current (CC) of 0.1 C was applied until reaching 4.3 V, and retained at 4.3 V (CV) until reaching 0.01 C. After a 10 min resting period, initial discharge was carried out in the CC mode of 0.1 C to 3.0 V. After several cycles to stabilize the cell, a charge of 0.5 C in CC-CV mode was applied in the same voltage range and discharge capacity at 0.1 C in CC mode was monitored.

IV.1.2 25° C. Cycle Performance

The 25° C. cycle performance was measured as follows:

After the initial performance test was conducted according to IV.2.1, cells were tested in a voltage range between 4.3 V to 3.0 V at 25° C., conducted in the CC-CV mode, i.e., a constant current (CC) of 0.5 C was applied until reaching 4.3 V, and retained at 4.3 V (CV) until reaching 0.01 C. After a 10 min resting period, discharge was carried out in the CC mode of 1 C to 3.0 V. The retention of the capacity was calculated by the ratio of the discharge capacity of the first cycle and the 100$^{th}$ cycle.

After 100 cycles, the coin half cells were retested under the conditions of IV.1.1, under a charge of 0.5 C was applied in the same voltage range and discharge capacity at 0.1 C, and the discharge capacity values before and after the cycling tests were compared.

IV.1.3 45° C. Cycle Performance

The 45° C. cycle performance was measured as follows:

Coin half cells fabricated according to III.3.1 were tested in a voltage range between 4.25 V to 3.0 V at 45° C. For the initial cycle, the initial charge was conducted in the CC-CV mode, i.e., a constant current (CC) of 0.1 C was applied until reaching 4.25 V, and retained at 4.25 V (CV) until reaching 0.01 C. After a 10 min resting period, initial discharge was carried out in the CC mode of 0.1 C to 3.0 V.

After the initial performance test was conducted, cells were cycled in a voltage range between 4.25 V to 3.0 V at 45° C., charging was conducted in the CC-CV mode, i.e., a constant current (CC) of 0.5 C was applied until reaching 4.25 V, and retained at 4.25 V (CV) until reaching 0.01 C. After a 10 min resting period, discharge was carried out in the CC mode of 0.5 C to 3.0 V. The retention of the capacity was calculated by the ratio of the discharge capacity of the first cycle and the 30$^{th}$ cycle. In parallel, the increase of the cell resistance during the cycling was monitored from the initial drop of the cell voltage during the discharge.

TABLE 1

Initial performance

| CAM | y | 1$^{st}$ 0.1 C Specific Charge Capacity [mA · h/g] | 0.1 C Specific Discharge Capacity [mA · h/g] |
|---|---|---|---|
| B-CAM.1 | — | 237.8 | 209.2 |
| CAM.1 | 0.003 | 237.3 | 212.0 |
| CAM.2 | 0.003 | 237.1 | 211.3 |
| CAM.3 | 0.003 | 237.4 | 211.0 |
| C-CAM.4 | *— | 237.3 | 209.7 |
| C-CAM.5 | 0.01 | 233.7 | 189.7 |
| C-CAM.6 | 0.02 | 229.0 | 176.0 |
| C-CAM.7 | 0.03 | 224.1 | 166.1 |
| C-CAM.8 | 0.01 | 234.1 | 191.9 |
| C-CAM.9 | 0.02 | 229.8 | 177.5 |
| C-CAM.10 | 0.03 | 224.2 | 166.3 |

*made with crystalline Nb compound instead

TABLE 2

25° C. cycling retention and retained capacity after the cycling

| CAM | 100$^{th}$ 0.5 C/1 C Cycle Discharge Capacity Retention/% | After Cycle 0.1 C specific Discharge Capacity [mA · h/g] | 0.1 C Discharge Capacity After/Before Cycling [%] |
|---|---|---|---|
| B-CAM.1 | 79.3 | 179.0 | 85.6 |
| CAM.1 | 81.5 | 182.8 | 86.2 |
| CAM.2 | 80.7 | 182.9 | 86.5 |
| CAM.3 | 81.8 | 185.4 | 87.9 |
| C-CAM.4 | 80.3 | 179.3 | 85.5 |

TABLE 3

45° C. cycling retention and resistance growth

| CAM | 30$^{th}$ 0.5 C/0.5 C Cycle Discharge Capacity Retention [%] | 30$^{th}$ 0.5 C/0.5 C Cycle Resistance Growth [%] |
|---|---|---|
| B-CAM.1 | | |
| CAM.1 | 91.9 | 185 |
| CAM.2 | 92.2 | 150 |
| CAM.3 | 92.2 | 170 |
| C-CAM.4 | 91.1 | 202 |

The invention claimed is:

1. Process A process for making an electrode active material according to general formula $Li_{1+x}(TM_{1-y}M^1_y)_{1-x}O_2$, wherein TM is a combination of metals according to general formula (I),

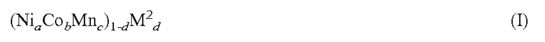

wherein a is in a range of from 0.6 to 0.99, b is in a range of from 0.005 to 0.2, c is in a range of from 0.005 to 0.2, and d is in a range of from zero to 0.1, $M^2$ is at least one of Al, Mg, W, Ti, and Zr, a+b+c=1, x is in a range of from zero to 0.2, $M^1$ is selected from the group consisting of Nb and Ta, and y is in a range of from 0.001 to less than 0.01, said process comprising the following steps:

(a) mixing (A) a particulate mixed oxide or (oxy) hydroxide of Mn, Co and Ni, and (B) at least one lithium compound selected from the group consisting of lithium hydroxide, lithium oxide and lithium carbonate, and (C) an amorphous compound of Nb or Ta, and (b) subjecting said mixture to heat treatment at a temperature in a range of from 700 to 1000° C., wherein at least 60 mole-% of a transition metal of TM is Ni.

2. The process according to claim 1, wherein said mixing in step (a) is performed in a dry state.

3. The process according to claim 1, wherein step (b) is performed in a rotary kiln or a roller hearth kiln.

4. The process according to claim 1, wherein (C) is amorphous niobic acid $Nb_2O_5$ or amorphous $Ta_2O_5$.

5. The process according to claim 1, wherein (C) has an average particle diameter (D50) in a range of from 1 to 100 µm.

6. The process according to claim 1, wherein a compound (D) is present in step (a) and is selected from the group consisting of oxides or (oxy) hydroxides of Al, Ti and Zr.

7. The process according to claim 1, wherein (A) is obtained by co-precipitation of a mixed hydroxide of nickel, cobalt and manganese, followed by drying under air and de-hydration.

8. An electrode active material according to the general formula $Li_{1+x}(TM_{1-y}M^1_y)_{1-x}O_2$, wherein TM is a combination of metals according to general formula (I), x is in a range of from zero to 0.2, $M^1$ is selected from the group consisting of Nb and Ta, and y is in a range of from 0.001 to less than 0.01,

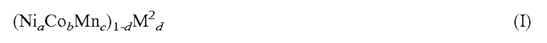

wherein a is in a range of from 0.6 to 0.99, b is in a range of from 0.005 to 0.2, c is in a range of from 0.005 to 0.2, and d is in a range of from zero to 0.1, $M^2$ is at least one of Al, Mg, W, and Zr, a+b+c=1, and an average particle diameter (D50) in a range of from 3 to 20 µm, wherein at least 60 mol-% of TM is Ni, wherein Nb or Ta, respectively, is enriched on a surface of primary particles compared to a bulk, and wherein the electrode active material is comprised of secondary particles that are agglomerates of primary particles.

9. The electrode active material according to claim 8, wherein $M^1$ is Nb.

10. A cathode comprising (α) the electrode active material according to claim 8, (β) carbon in electrically conductive form, and (γ) a binder material.

11. The cathode according to claim 10 comprising (α) 80 to 98% by weight cathode active material, (β) 1 to 17% by weight of carbon, and (γ) 3 to 10% by weight of the binder material, wherein the percentages refer to a sum of (α), (β) and (γ).

12. An electrochemical cell comprising the cathode according to claim 10.

* * * * *